INVENTORS
ROY L. EISENBERG
MELVIN F. WILLIAMS

BY [signature]
ATTORNEY

INVENTORS
ROY L. EISENBERG
MELVIN F. WILLIAMS

BY [signature]

ATTORNEY

Jan. 13, 1970 R. L. EISENBERG ET AL 3,490,022

LOOP ANTENNA COUPLER HAVING AUTOMATIC DIRECTIVITY PATTERN SWITCHING

Filed Sept. 9, 1968 8 Sheets-Sheet 3

INVENTORS
ROY L. EISENBERG
MELVIN F. WILLIAMS

BY [signature]

ATTORNEY

INVENTORS
ROY L. EISENBERG
MELVIN F. WILLIAMS
BY
ATTORNEY

INVENTORS
ROY L. EISENBERG
MELVIN F. WILLIAMS
BY [signature]
ATTORNEY

Jan. 13, 1970 R. L. EISENBERG ET AL 3,490,022

LOOP ANTENNA COUPLER HAVING AUTOMATIC DIRECTIVITY PATTERN SWITCHING

Filed Sept. 9, 1968 8 Sheets-Sheet 6

INVENTORS
ROY L. EISENBERG
MELVIN F. WILLIAMS

BY [signature]

ATTORNEY

INVENTORS
ROY L. EISENBERG
MELVIN F. WILLIAMS

BY [signature]

ATTORNEY

INVENTORS
ROY L. EISENBERG
MELVIN F. WILLIAMS
BY [signature]
ATTORNEY

United States Patent Office 3,490,022

Patented Jan. 13, 1970

3,490,022

LOOP ANTENNA COUPLER HAVING AUTOMATIC DIRECTIVITY PATTERN SWITCHING

Roy L. Eisenberg, Bowie, Md., and Melvin F. Williams, Washington, D.C., assignors to the United States of America as represented by the Secretary of the Navy Filed Sept. 9, 1968, Ser. No. 758,233
Int. Cl. G01s *1/30*
U.S. Cl. 343—105 14 Claims

ABSTRACT OF THE DISCLOSURE

A crossed-loop antenna coupler for use in a navigation system including relative bearing calculating circuits, comprising either potentiometers or digital-to-analog converters; converson means, comprising either Schmitt trigger circuits or an analog-to-digital converter; logic circuit means, comprising either "AND" and "OR" circuits or "NAND" circuits; and switching circuits, for automatically rendering operative the particular antenna or antennas to be used, with particular phase relationships, so as to provide the best directivity pattern for reception of the signals from various ground transmitting stations without affecting the phase of the received signals.

The invention described herein may be manufactured and used by or for the Government of the United States of America for governmental purposes without the payment of any royalties thereon or therefor.

This invention relates to an antenna coupler circuit and more particularly to an automatic switching circuit for coupling the outputs of a crossed-loop receiving antenna to an omega navigation receiver.

This invention is adaptable for use in any system wherein it is desired to automatically switch between various antennas utilized in the system. It is particularly adaptable to navigational systems employing hyperbolic isophase lines such as that shown in U.S. Patent No. 3,209,356. The omega navigation system is a typical hyperbolic isophase line navigation system presently in experimental use by the United States Navy and will be used to explain and illustrate the principles of this invention. It is to be understood that the invention is in no way restricted to use in such systems, and is described in the omega system, which is the preferred embodiment, solely for the purpose of aiding the illustration of the invention.

The omega system utilizes four fixed transmitting stations located at great distances from each other on the earth's surface. Each station in this system transmits a sequentially repeated CW signal which utilizes multiple frequency time sharing techniques. The phases of the CW signals from the various stations are accurately syncronized enabling the system to produce hyberbolic lines of equal phase covering the entire surface of the earth. The information provided by these hyberbolic lines can be used to provide accurate measurement of location by either aircraft or ships. A similar VLF long range navigation system is shown and described in Patent No. 3,209,356. It can be seen that the accurate phase reception of the signals transmitted from the different stations in either the omega system or the system described in the patent is of extreme importance in order to provide accurate navigational information. It can be further seen that the use of omnidirectional whip antennas or the like, while producing suitable phase characteristics for the receiver, do not provide the directivity patterns necessary for the best possible reception.

In navigational systems of the omega type, it has been the general practice in the past to use an omni-directional whip antenna which is directly coupled to the receiver. Although such systems have served the purpose, they have not proved entirely satisfactory under all conditions of service since they have poor signal to noise characteristics and are extremely bulky. The use of a crossed-loop antenna has many advantages over a whip antenna in addition to better signal to noise ratio and smaller size. First, the controlled directional patterns of the loops discriminate against interfering signals and localized atmospheric noise. Second, the loop antennas discriminate against local electrostatic man-made noise fields thereby providing further improvement in the signal to noise ratio. Third, the loop antennas are reduced in size over whip antennas and therefore have the capability of underwater operation or use in aircraft.

As pointed out above, the omega system utilizes phase comparison techniques, and therefore the relative phase of the signals received from the different stations in the system must not be affected by the antenna. A single fixed loop antenna may be used in the omega system without affecting the relative phase of the received signals, however it has a 0 or 180° RF phase ambiguity along with two null positions characteristic of the conventional figure eight pattern. For two fixed crossed-loop antennas, on the other hand, utilized in conjunction with a switching system which does not affect the phase of incoming signals, the phase ambiguity can be resolved and the nulls can be reduced to a maximum sensitivity loss of 3 decibels at the cross-over point. Furthermore, if the outputs of the two loops are added and used with a similar switching system, the decrease in sensitivity at the null points can be further reduced.

Accordingly, it is an object of this invention to couple the outputs of a crossed-loop antenna system to an omega navigational receiver without affecting the relative phase of the received signals.

It is a further object of this invention to automatically activate particular ones of an array of antennas to provide any of various directivity patterns.

An additional object of this invention is to cyclically switch various antennas into operation so as to provide a cyclically varying directivity pattern to a receiver.

It is a still further object of this invention to analyze vehicle heading and station bearing information, to calculate relative bearing, and to automatically adjust the directivity pattern of an antenna array to correspond thereto for optimum sensitivity.

It is a still further object of this invention to provide a lightweight antenna coupler combination for use in navigation receiver systems, particularly in aircraft and submarines.

These and other objects are attained in accordance with the principles of the invention in one illustrated embodiment that utilizes automatic switching equipment to switch any one of four directivity patterns into operation in response to calculated relative bearing information provided by the invention.

A further embodiment of the invention utilizes NAND logic circuits to switch between any of eight directivity patterns. Both embodiments are adaptable for use in either a single frequency or a multi-frequency time sharing system.

The principles of the invention together with additional objects and features thereof will be fully comprehended from the following detailed description of the illustrative embodiments and from the drawings in which.

Figures 1, 3:
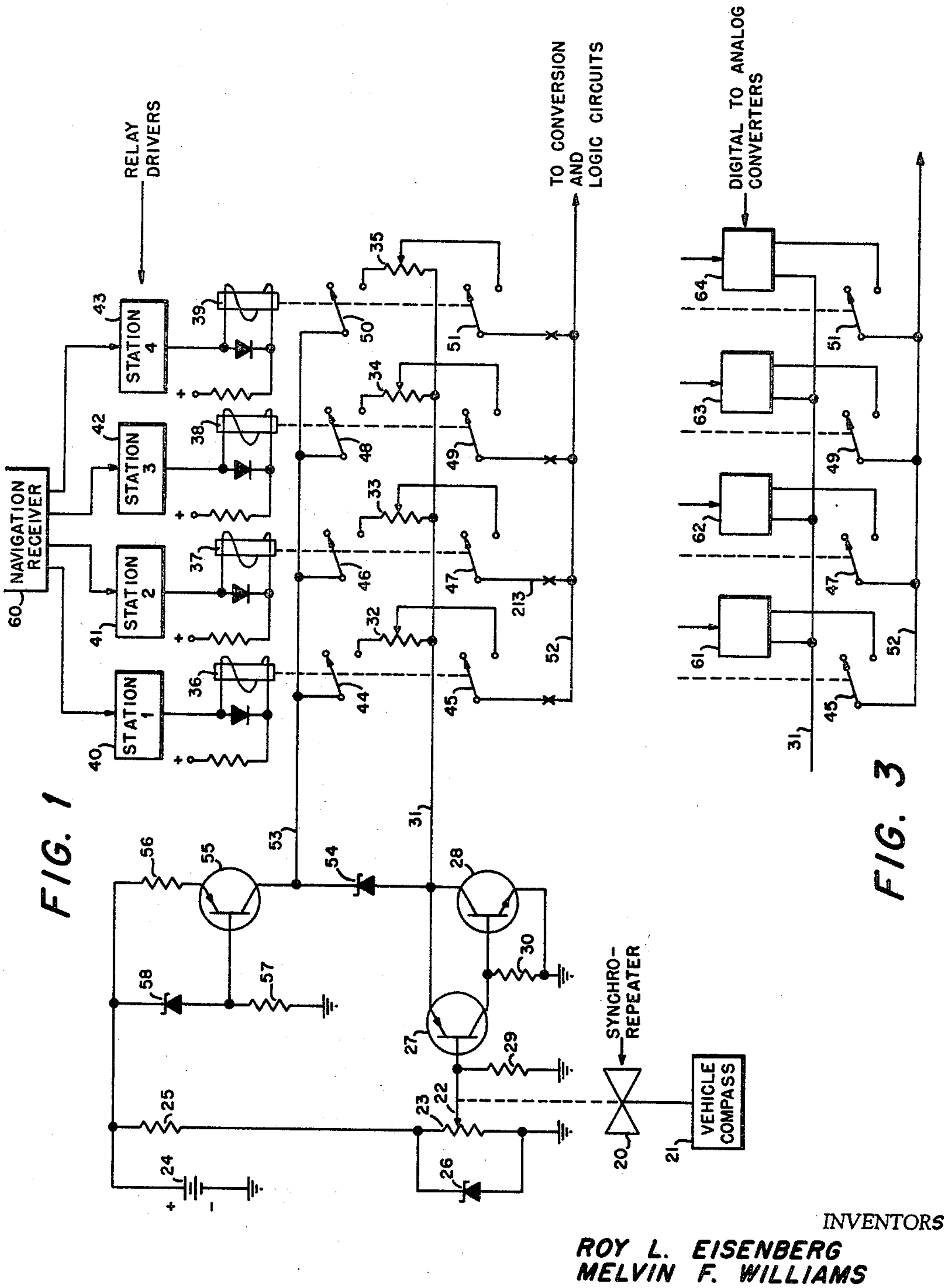
FIG. 1 is a schematic diagram, partially in block diagram form, showing the relative bearing calculating circuits of the invention.
FIG. 3 is a schematic diagram, partially in block diagram form, showing a modification of the circuit of FIG. 1.
Figure 2B:
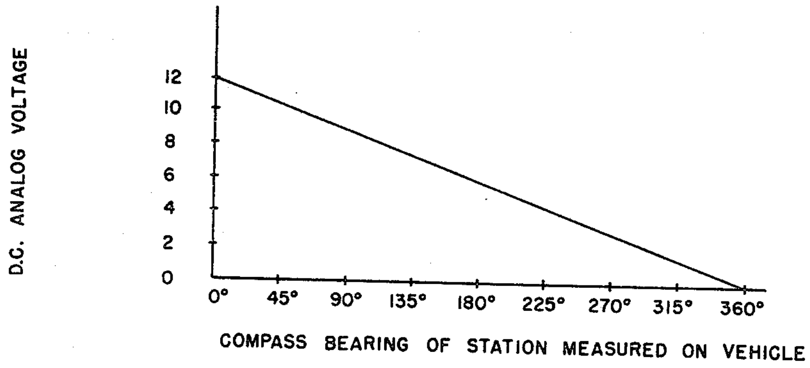
FIGS. 2A, 2B and 2C are graphs used to explain the principles of operation of the relative bearing circuits shown in FIG. 1.
Figure 2A:
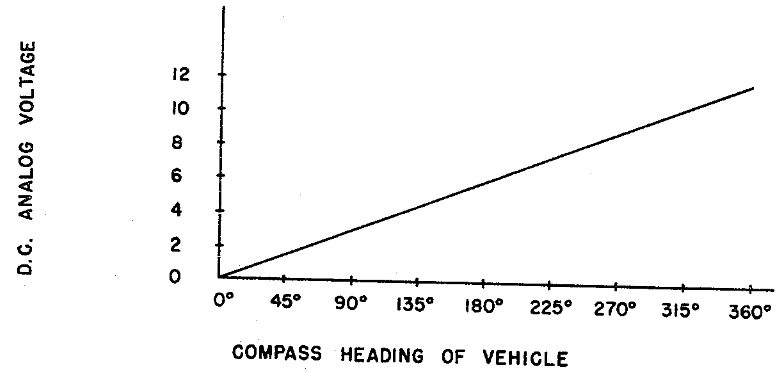
Figure 2C:
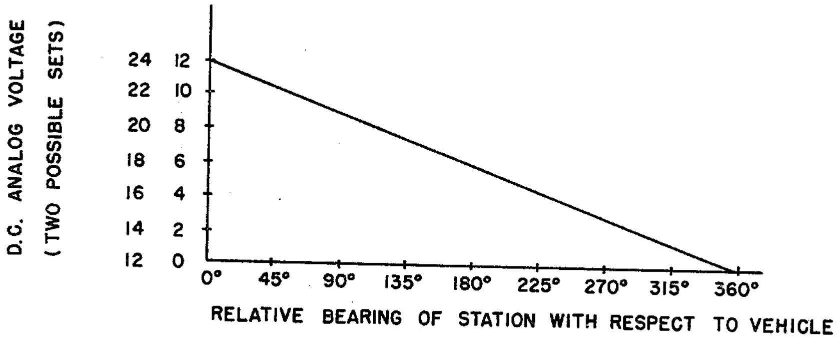

Referring now to the drawings, wherein like reference characters designate like or corresponding parts throughout the several views, there is shown in FIG. 1 a synchro-repeater 20 which receives information relating to the compass heading of the vehicle upon which the invention is mounted from compass 21 and drives the wiper arm 22 of potentiometer 23. The potentiometer 23 is supplied with a constant voltage from the power supply 24 through resistor 25. The voltage is maintained constant by Zener diode 26 which is connected across the potentiometer to ground. The output from potentiometer 23, appearing on wiper arm 22, is supplied through a conventional emitter follower circuit comprising transistors 27 and 28 and resistors 29 and 30, to line 31. The circuit further includes potentiometers 32, 33, 34 and 35, each of which can be manually set to correspond to the compass bearing of a respective one of the ground stations as measured on the vehicle. The potentiometers 32, 33, 34 and 35 are sequentially connected between lines 53 and 31 to form voltage dividers for providing an output voltage on line 52 which at any instant of time is the sum of the voltage on line 31, representing the heading of the vehicle, and a manually preset fraction of the voltage on line 53, which fraction represents the bearing of one of the ground stations as measured on said vehicle. The voltage on line 31 is shown in graph 2A, and the voltage appearing on the wiper arm of each of the potentiometers 32, 33, 34 and 35 with respect to the voltage on line 31 is shown in graph 2B. The sum of these two signals, appearing on line 52, is a DC analog signal representative of the relative bearing of the ground station with respect to the vehicle as shown in FIG. 2C, and is fed to subsequent logic and switching circuits, to be more fully explained below. The potentiometers 32, 33, 34 and 35 are connected to the circuit by relay contact pairs 44–45, 46–47, 48–49 and 50–51 activated by relays 36, 37, 38 and 39, respectively, which are sequentially actuated by signals from the navigation receiver 60 through relay drivers 40, 41, 42 and 43, respectively. Each of the relays 36, 37, 38 and 39 is shown in its normal or unactivated state. The voltage on line 53 is maintained constant with respect to the fluctuating voltage on line 31 by Zener diode 54, which is supplied with a constant current source comprising transistor 55, resistors 56 and 57, Zener diode 58 and source 24.

Referring now to FIG. 3, four digital-to-analog converters 61, 62, 63 and 64 are shown which can be substituted for potentiometers 32, 33, 34 and 35, respectively, in the circuit of FIG. 1. It is noted that contacts 44, 46, 48 and 50 as well as Zener diode 54 and the constant current supply are not necessary with this modification. In this particular embodiment, the bearing information of each station as measured on the vehicle can be automatically provided as a digital input to each of the digital to analog converters 61, 62, 63 and 64 by a computer carried by the vehicle. The output voltage from each of the converters is added to the voltage appearing on line 31 and the sum thereof appears on output line 52 as in FIG. 1.

Figure 4:
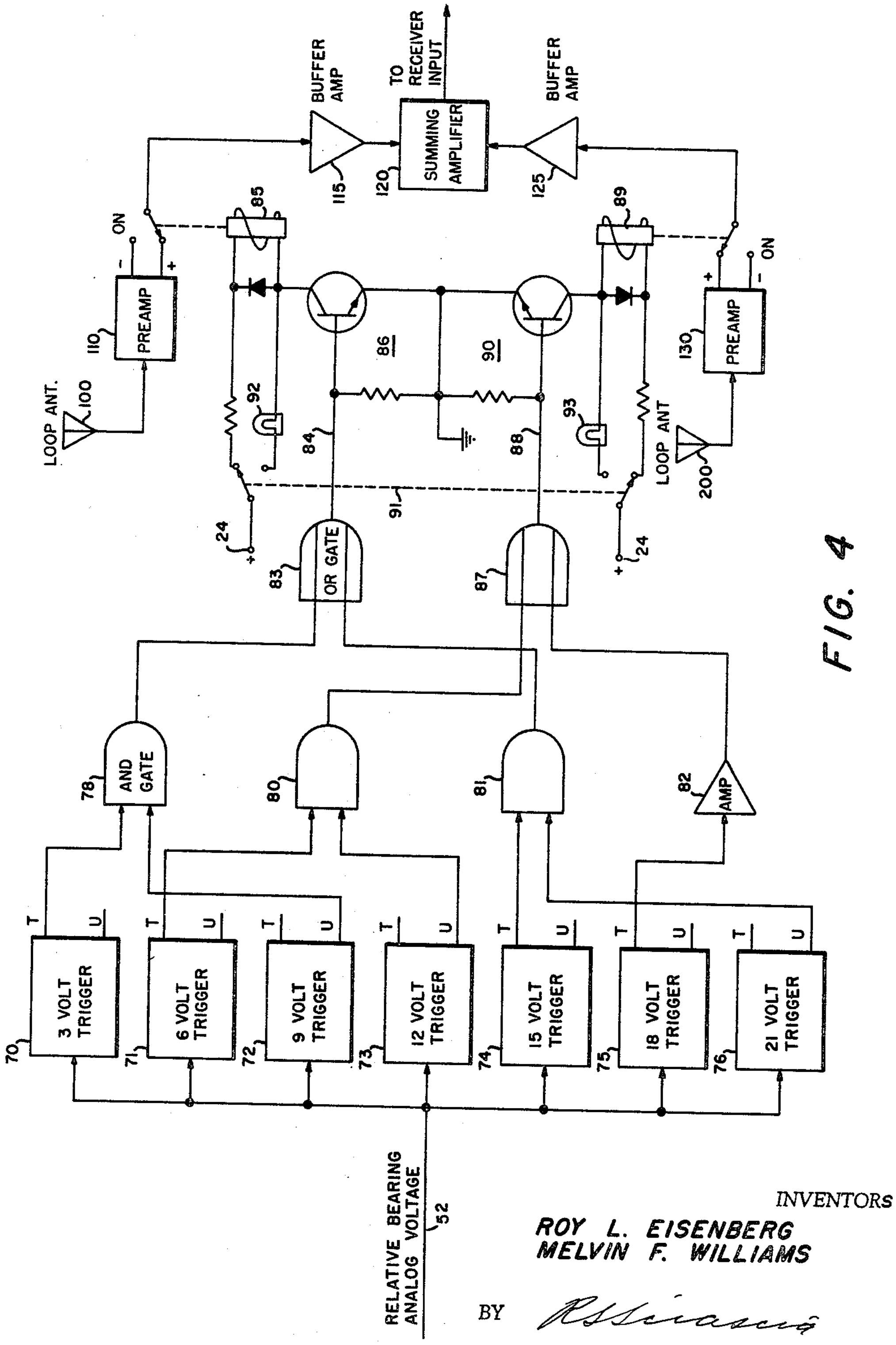
FIG. 4 is a schematic diagram, partially in block diagram form, showing the switching and logic circuits of one embodiment of the invention.

The relative bearing analog voltage on line 52 from the circuit of FIG. 1 is applied to the inputs of identical trigger circuits 70, 71, 72, 73, 74, 75 and 76 of FIG. 4. Each trigger circuit is designed to provide an untriggered output on terminal U unless the input signal voltage is above a preset fixed amplitude, whereupon the untriggered output ceases and a triggered output is provided on terminal T. Such a circuit is shown in FIG. 5.

Figure 5:
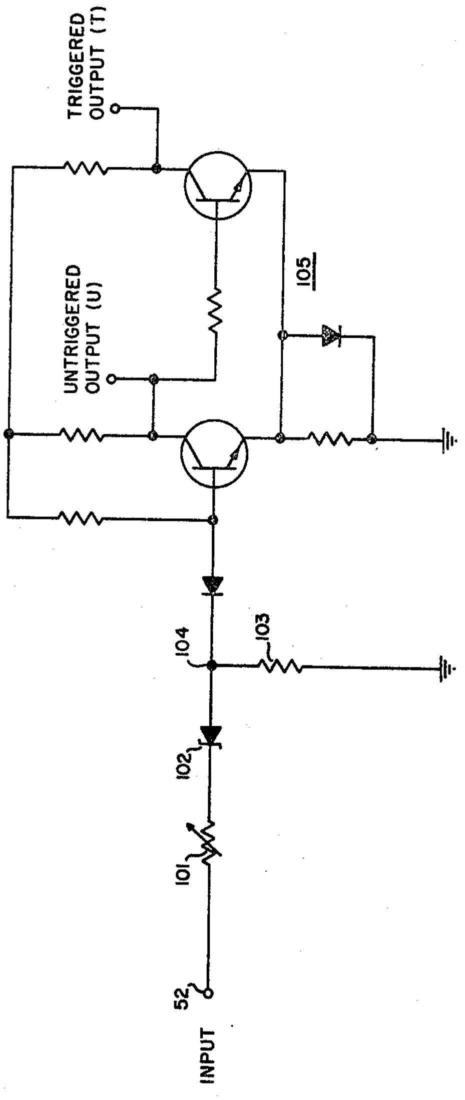
FIG. 5 is a schematic diagram of one of the trigger circuits used with the particular embodiment of the invention shown in FIG. 4.

In the circuit of FIG. 5, the input from line 52 is applied through the series combination of resistor 101, Zener diode 102 and resistor 103 to ground. By selecting the proper Zener diode 102, and by adjusting the voltage divider comprised of resistors 101 and 103, the particular trigger circuit can be present to trigger on any of the various desired input voltage amplitudes. In FIG. 5, the trigger circuit is shown as a conventional Schmitt trigger 105; however, it is to be understood that any trigger circuit producing either a triggered or an untriggered output in response to an input signal having a particular amplitude may be substituted therefor.

Referring again to FIG. 4, each of the trigger circuits 70–76 are designed, in accordance with the principles shown in FIG. 5, to trigger upon receipt of a signal equal to or greater than that indicated in the drawing. For example trigger 72 will give a triggered output signal on terminal T upon receipt of a DC voltage on line 52 greater than or equal to 9 volts. It is noted that in the example above, if the signal on line 52 is 10 volts, each of the triggers 70, 71 and 72 will produce an output on terminal T. At the same time, each of the trigger circuits 73–76 will produce an output on terminal U. It can thus be seen that the trigger circuits 70–76 will produce output signals on terminals T and U in accordance with the following table, where T and U indicate the triggered and untriggered states, respectively:

TABLE II

| DC analog voltage on line 52 (volts) | Condition of trigger circuits | | | | | | |
|---|---|---|---|---|---|---|---|
| | 70 | 71 | 72 | 73 | 74 | 75 | 76 |
| 0–2.99 | U | U | U | U | U | U | U |
| 3-5-99 | T | U | U | U | U | U | U |
| 6–8.99 | T | T | U | U | U | U | U |
| 9–11.99 | T | T | T | U | U | U | U |
| 12–14.99 | T | T | T | T | U | U | U |
| 15–17.99 | T | T | T | T | T | U | U |
| 18–20.99 | T | T | T | T | T | T | U |
| 21–24 | T | T | T | T | T | T | T |

Continuing with FIG. 4, it can be seen that an output will appear on line 77 when trigger 70 is in its triggered state; and this output will then be fed to one input of AND gate 78. Similarly, when trigger 72 is in its untriggered state, in output will appear on line 79 which will be fed to the second input of AND gate 78. In similar fashion, AND gates 80 and 81 and amplifier 82 are connected to receive triggered and untriggered output signals from trigger circuits 71 and 73, 74 and 76, and 75, respectively, as shown. The output from AND gates 78 and 81 are applied to OR gate 83 which provides an output signal on line 84 to drive relay 85 through relay driver 86. In like fashion, the outputs from AND gate 80 and amplifier 82 are fed to OR gate 87 which produces an output signal on line 88 to drive relay 89 through relay driver 90. Relays 85 and 89 are energized through switch 91, in the position shown, by power source 24. When switch 91 is in the other position, pilot lamps 92 and 93 provide a visual indication of the state of the two relays 85 and 89. The contacts of relay 85 connect antenna 100 to summing amplifier 120 through buffer amplifier 115 and preamplifier 110. In like fashion, antenna 200 is connected to summing amplifier 120 via buffer amplifier 125 and preamplifier 130 by the contacts of relay 89.

Preamplifiers 110 and 130 each provide two output signals, indicated as positive (+) and negative (−), respectively, which correspond to the 0° and 180° RF phase ambiguity produced by the characteristic figure eight directivity pattern of the loop antennas. Both relays 85 and 89 are shown in FIG. 4 as being in their normal or unactivated state, and in this position, both antennas 100 and 200 are fed to the receiver input with their 0° RF phase lobe being operative.

Figures 6A, 6B, 7:
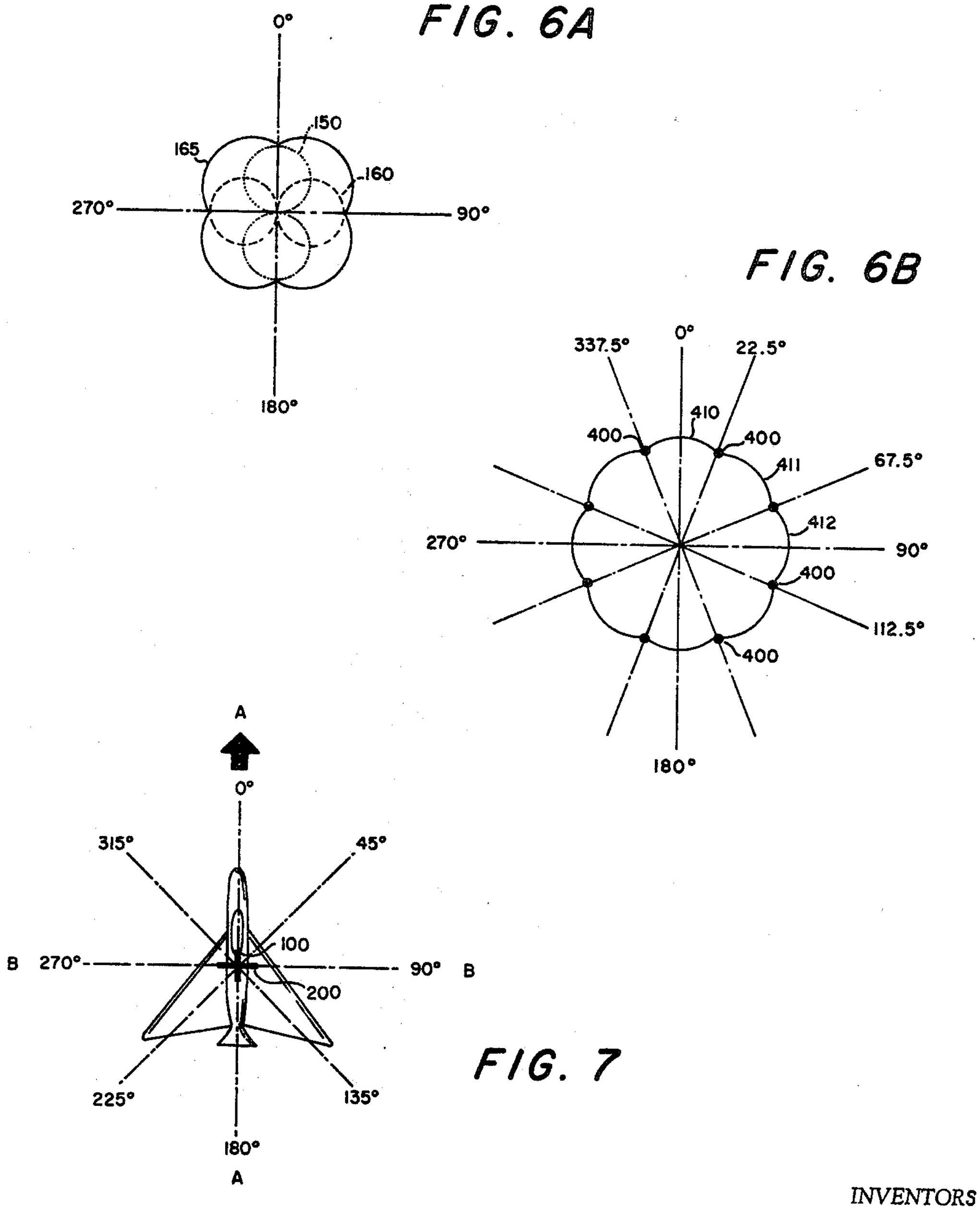
FIGS. 6A and 6B illustrate the directivity patterns produced by the invention.
FIG. 7 shows the relative position of the two crossed-loop antennas with respect to the aircraft utilized to illustrate the principles of operation of the invention.

Referring now to FIG. 6A, the conventional figure eight pattern obtained by antenna 100 is shown by dotted curve 150 with the positive (+) and negative (−) lobes illustrated above and below the horizontal axis, respectively; while the conventional figure eight curve obtained by antenna 200 is shown in like manner by dashed curve 160 with the positive (+) and negative (−) lobes shown to the right and left of the vertical axis, respectively. As can be seen in the embodiment illustrated in FIG. 4, the outputs from the two antennas are added in summing amplifier 120 and applied to the receiver input; the resultant pattern obtained through the use of the automatic antenna coupler is shown by the solid curve 165 in FIG. 6A. Thus if the relative bearing of the ground station with respect to the vehicle is anywhere between 90° and 180°, for example, relay 89 should be in its normal or unactivated position and relay 85 should be in its activated position to thereby provide the receiver input with the sum of the signals produced by the positive lobe of antenna 200 and the negative lobe of antenna 100.

FIG. 7 diagrammatically shows an airplane on a compass chart to illustrate the relative position of antennas 100 and 200. Loop antenna 100 has its axis on line B—B, and loop antenna 200 has its axis on line A—A. The antennas are mounted as shown with their axis 90° apart from each other in a horizontal plane to give the resultant directivity pattern indicated in FIG. 6A.

Figures 8, 9:
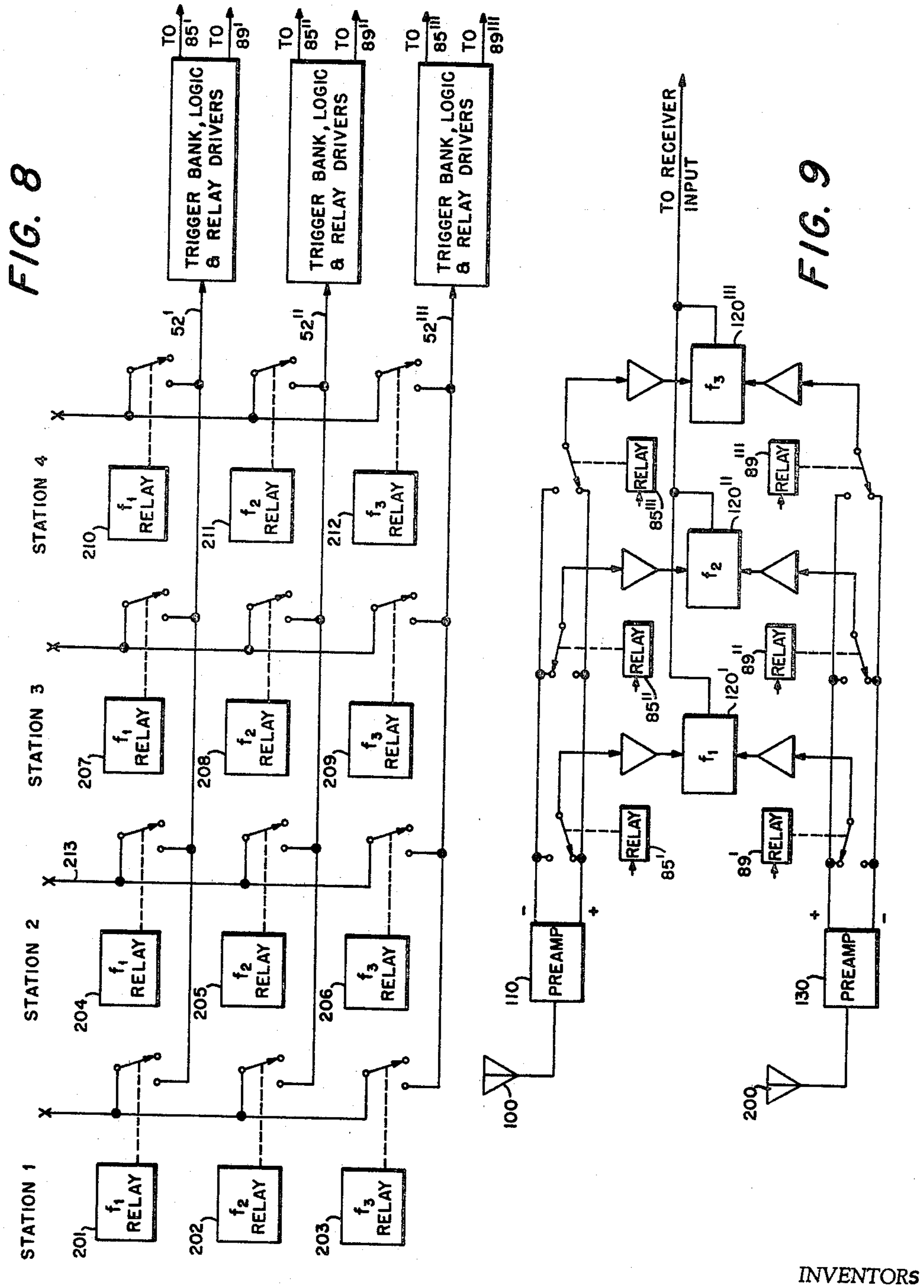
FIGS. 8 and 9 are block diagrams of the multi-frequency embodiment of the invention.

Referring now to FIGS. 8 and 9, in conjunction with FIG. 1, a three frequency navigation system is disclosed which utilizes well known time sharing techniques. Much of the circuitry of FIGS. 8 and 9 is repeated from FIG. 1 and FIG. 4 and like reference numerals are used throughout to refer to like circuits, with the single, double and triple primed numbers referring to the frequencies $f_1$, $f_2$ and $f_3$, respectively, used in the system. It is noted that line 52 in FIG. 1 is eliminated, and points X in FIG. 1 are connected to corresponding points X in FIG. 8 to complete the illustration of this embodiment. The bearing information from each of the potentiometers 32, 33, 34 and 35, corresponding to the four ground stations in the system, is supplied to the four relay banks 201–203, 204–206, 207–209 and 210–212, respectively. Each of the four relay banks contains three relay networks one each responsive to the transmission of one of the three frequencies $f_1$, $f_2$ and $f_3$. In the multi-frequency system, three signals each transmitted at one of the three frequencies will be received by the navigation receiver at any one instant of time from three of the four ground stations. A different one of the ground stations will be inactive at all times. Thus, at any instant in time, one of the three frequency gate relays of three of the four relay banks will be actuated. For example, if at time $t_1$, ground station 1 is transmitting a signal at frequency $f_3$, station 2 is transmitting a signal at frequency $f_2$, station 3 is transmitting a signal at frequency $f_1$, and station 4 is inactive, relay drivers 40, 41 and 42, corresponding to stations 1, 2 and 3, will be activated. In addition, relay networks 203, 205 and 207 will be actuated, corresponding to frequencies $f_3$, $f_2$ and $f_1$ of stations 1, 2 and 3, respectively. When relay driver 41 and relay 205, in the example, are activated, this means, as pointed out above, that station 2 is transmitting a signal at frequency $f_2$. Therefore, the relative bearing of station 2 must be fed through logic and switching circuits (identical to the circuitry of FIG. 4) so that the proper directivity pattern of the antenna is enabled to thereby feed the signal from station 2 to the narrow bandpass tuned summing amplifier 120″ with the greatest signal strength. This mode is automatically provided when relay driver 41 and relay 205 are activated since driver 41 will activate relay 37 to connect potentiometer 33 to the system through contacts 46–47 to thereby provide an output on line 213 which is connected to line 52″ through the contacts of relay 205. Line 52″ corresponds to line 52 in FIG. 1 and is fed to trigger bank, logic and relay driver circuits (as shown in FIG. 4) to drive relays 85″ and 89″ shown in block diagram form in FIG. 9. The proper antenna combination will then be switched into operation to provide input signals to the summing amplifier 120″ which is tuned to pass only those signals in the range of $f_2$ to the receiver input. In like manner any station transmitting any one of the frequencies $f_1$, $f_2$ or $f_3$ can be provided with the proper directivity pattern so as to enable the best possible reception of the signal from that particular channel. Furthermore, the capability of use in systems having more than four stations or more than three frequencies can be realized by extending the principles described above in obvious manners.

Figure 10:
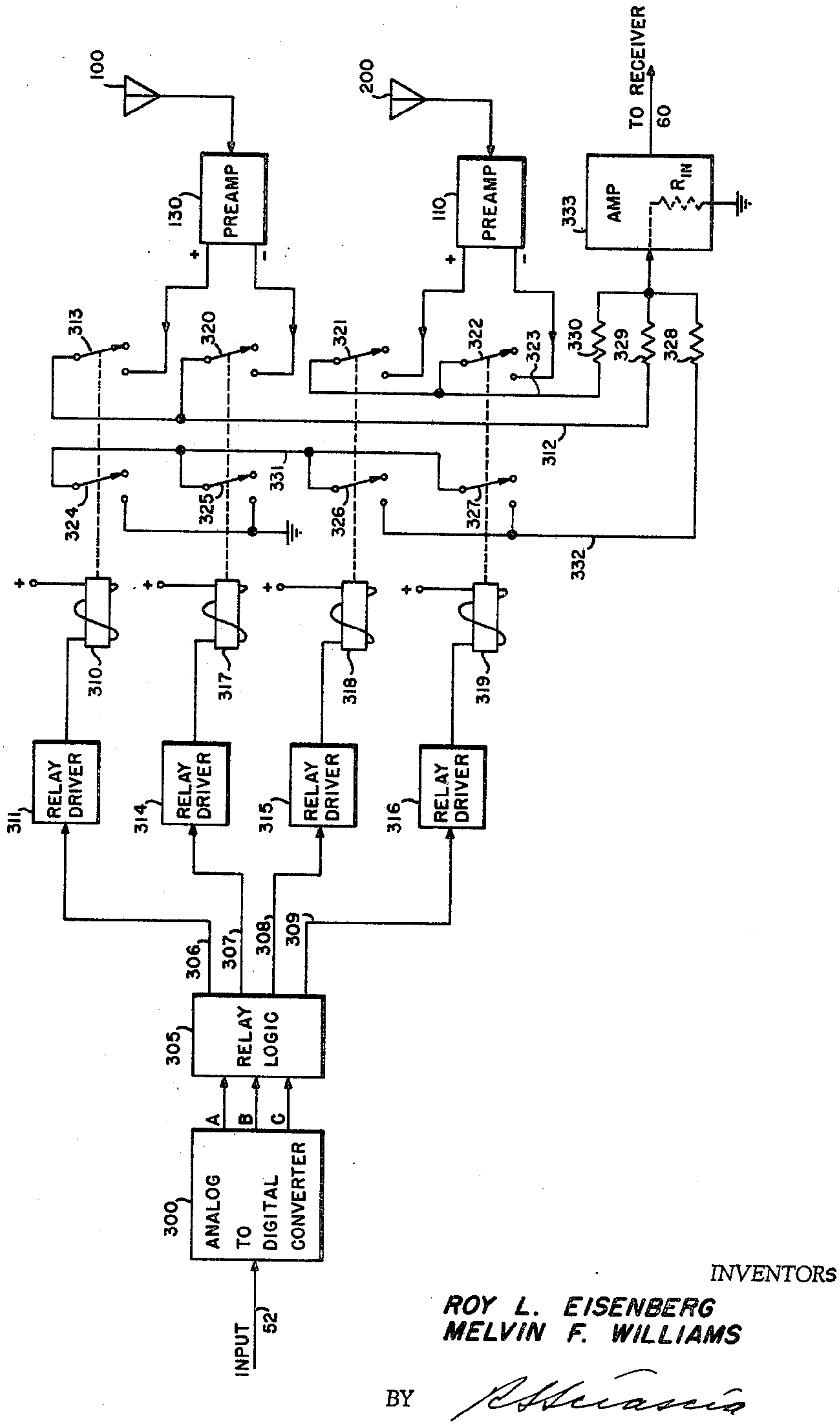
FIGS. 10 and 11 illustrate a second embodiment of the switching and logic circuits to be used with the circuit of FIG. 1.

Referring now to FIG. 10, there is shown a further embodiment of the logic and switching circuits of the invention. In this embodiment, combinations of the outputs from one antenna and the summed output from both antennas are utilized to provide any one of eight possible directivity patterns to thereby provide a signal having the greatest signal strength to the input of the receiver. The resultant directivity pattern is shown diagrammatically in FIG. 6B, where the eight segments are separated by cross over points 400. Segment 410 represents the directivity pattern produced by the positive lobe of antenna 100 and is utilized to receive signals from stations having a relative bearing anywhere between 337.5° and 22.5°. Similarly, segment 411 is produced by the addition of the signals from the positive lobe of antenna 200 and the positive lobe of antenna 100 and is used to receive signals from stations having a relative bearing between 22.5° and 67.5°. In FIG. 10, the DC analog voltage on line 52 from FIG. 1, representative of relative bearing, is fed to analog-to-digital converter 300 which produces a three digit binary coded signal. The binary coded signal appearing on lines A, B and C in FIG. 10 corresponds to the relative bearing of the ground station with respect to the aircraft in the manner shown in Table II.

TABLE II

| Relative bearing (deg.) | Binary coded signal A | B | C |
|---|---|---|---|
| 337.5–22.5 | 0 | 0 | 0 |
| 22.5–67.5 | 0 | 0 | 1 |
| 67.5–112.5 | 0 | 1 | 0 |
| 112.5–157.5 | 0 | 1 | 1 |
| 157.5–202.5 | 1 | 0 | 0 |
| 202.5–247.5 | 1 | 0 | 1 |
| 247.5–292.5 | 1 | 1 | 0 |
| 292.5–337.5 | 1 | 1 | 1 |

Figure 11:
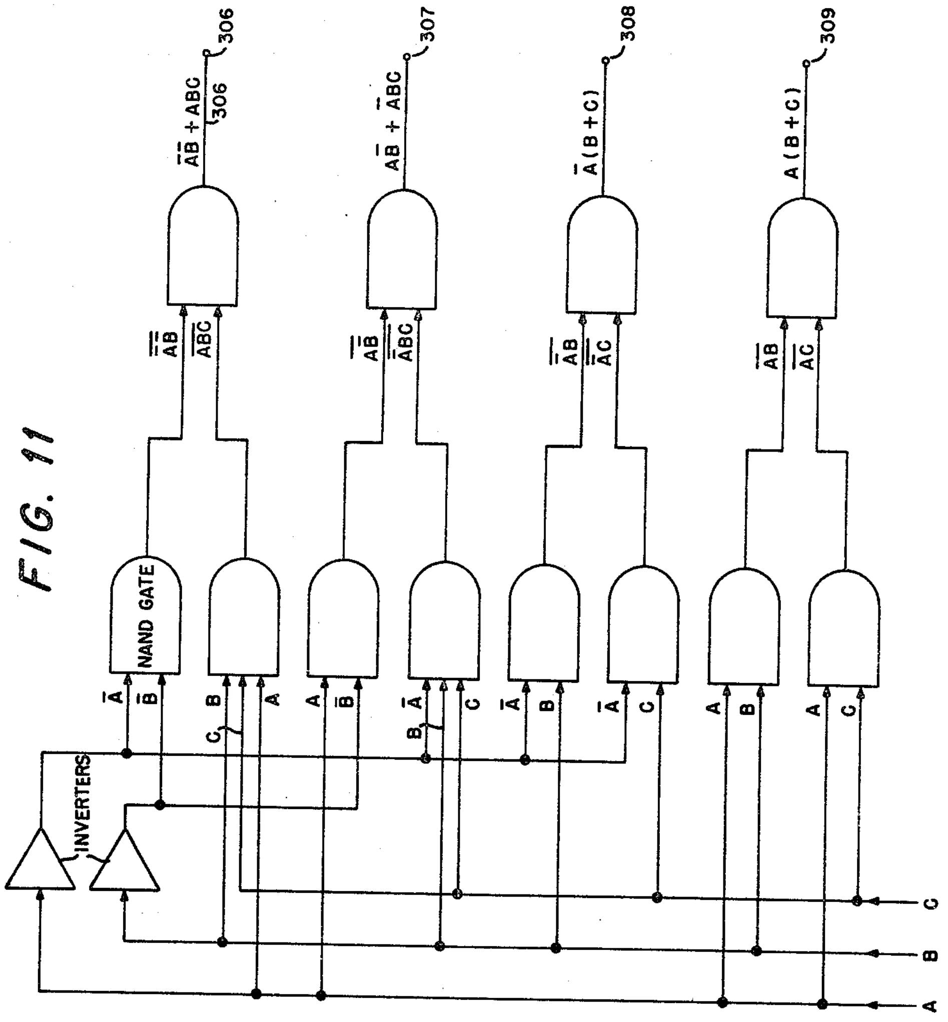

The binary coded signal is supplied to relay logic circuit 305 which is shown in detail in FIG. 11. The logic circuit shown in FIG. 11 utilizes NAND gates; however, it is noted that any suitable logic gate may be used with minor modifications obvious to those of ordinary skill in the art. Boolean algebra notation has been used in FIG.

11 to aid in understanding the operation of the circuits disclosed therein. The logic circuit shown in FIG. 11 produces any one of four output signals on terminals 306, 307, 308 and 309, respectively in accordance with Table III.

TABLE III

| Binary coded input | | | Output appears on terminal |
|---|---|---|---|
| A | B | C | |
| 0 | 0 | 0 | 306. |
| 0 | 0 | 1 | 306 and 308. |
| 0 | 1 | 0 | 308. |
| 0 | 1 | 1 | 308 and 307. |
| 1 | 0 | 0 | 307. |
| 1 | 0 | 1 | 307 and 309. |
| 1 | 1 | 0 | 309. |
| 1 | 1 | 1 | 309 and 306. |

Thus if a ground station is transmitting a signal to an aircraft having a relative bearing of 0° with respect to the ground station; i.e., the aircraft is heading directly toward the station, the directivity pattern corresponding to segment 410 of FIG. 6B would provide the best signal and would be desired. Referring to Table II, it can be seen that for a relative bearing of 0° the binary coded signal applied to relay logic 305 would be 000. Referring now to Table III, a 000 input to the relay logic circuit 305 produces an output on terminal 306. Referring again to FIG. 10, a signal appearing on line 306 will activate relay 310 through relay driver 311 to thereby connect the output from the positive lobe of antenna 100 to line 312 through preamplifier 130 and switch 313. Line 312 feeds the received signal to the receiver 60 through resistor 329 and amplifier 333.

In this example, none of the other relay drivers 314, 315 and 316 will activate the other relays 317, 318 and 319, and therefore, switches 320, 321 and 322 will remain in their normal or deactivated positions, as shown. Thus, the only output connected to the receiver is that received from the positive lobe of antenna 100 through preamplifier 130. Therefore the circuit has automatically programmed the receiver to utilize segment 410 of the composite directivity pattern shown in FIG. 6B as was desired.

In addition to switches 313, 320, 321 and 322, the relays 310, 317, 318 and 319, also actuate switches 324, 325, 326 and 327 to render operative an attenuation device comprising resistors 328, 329 and 330. Resistors 328, 329 and 330 are connected at one end to the input of amplifier 333. The other end of resistors 328, 329 and 330 are connected to switches 326 and 327, 313 and 320, and 321 and 322, respectively. The movable terminals of switches 326 and 327 are connected by line 331 to the movable terminals of switches 324 and 325. Thus, when relay 310 or 317 and relay 318 or 319 are simultaneously actuated, line 331, and therefore line 332, is grounded so that resistors 328, 329 and 330 form a 3 decibel signal attenuator. Since the output from both antennas 100 and 200 if added would provide a stronger signal to the receiver input than that provided by either one alone, the automatic 3 decibel attenuation circuit, which is activated whenever the outputs from both antennas are added, provides the smooth eight segment directivity pattern shown in FIG. 6B, and prevents any discontinuities from occurring therein. It is noted that resistors 329 and 330 are of equal value and are much greater than the value of the input impedance of amplifier 333 so that the amplifier itself will have negligible attenuation effects upon the input signals applied thereto. Furthermore, once the value of resistors 329 and 330 is selected, resistor 328 can be chosen so as to provide the desired attenuation factor whenever the signals from both antennas are applied simultaneously to amplifier 333.

Accordingly, one feature of the invention provides a compact device for use in aircraft and the like for automatically connecting a particular antenna to navigation equipment carried by the aircraft in response to the constantly measured relative bearing of a fixed transmission station.

Another feature provides an antenna system which will increase the sensitivity of a navigation receiver while reducing size and weight.

An additional feature of the invention involves the use of cross-looped antennas in a long range VLF navigation system of the type which utilizes hyperbolic isophase lines to thereby increase the signal to noise ratio of the received signals.

A still further feature of the invention is to provide a directional antenna system which is electronically switchable to various azimuthal directions without affecting the relative phase of received signals.

Thus, there is provided a relatively simple device which automatically provides the best possible directivity pattern to the input of a navigational receiver in response to the varying relative bearing of the various ground stations in the system with respect to the vehicle. Furthermore, there is provided a system which automatically and continuously tracks the relative position of the ground stations and programs the antenna coupler to thereby provide the strongest signal to the receiver input.

Various modifications are contemplated and may obviously be resorted to by those skilled in the art without departing from the spirit and scope of the invention, as hereinafter defined by the appended claims.

Having thus described the invention, what is claimed is:

1. In a navigation system including a plurality of fixed transmitting stations for providing location information to a vehicle, a plurality of directional loop antennas carried by said vehicle, and an antenna coupler for coupling said loop antennas to said navigational system comprising:

means for providing a first analog signal representative of the compass heading of said vehicle;

means for providing a second analog signal representative of the compass bearing of one of said plurality of fixed transmitting stations as measured from said vehicle;

means for combining said first and second analog signals thereby to provide a third analog signal representative of the relative bearing of said one station with respect to said vehicle;

analog to digital conversion means having an input terminal and a plurality of output terminals;

means for applying said third analog signal to the input terminal of said conversion means;

logic circuit means connected to the output terminals of said conversion means thereby to provide a plurality of control signals; and first switch means connected to said logic circuit means thereby to couple said plurality of directional loop antennas to said navigational system with a particular phase relationship in response to said control signals such that the directional characteristic of said plurality of antennas is automatically programmed for optimum reception sensitivity of the transmitted signal of said one station.

2. The device of claim 1 wherein said means for providing said second analog signal includes:

a plurality of adjustable means each corresponding to and representative of the compass bearing of one of said plurality of fixed transmitting stations as measured from said vehicle; and second switch means for cyclically connecting each of said plurality of adjustable means to said combining means.

3. The device of claim 2 wherein said second switch means includes:

a first plurality of relays each connected to activate one of said plurality of adjustable means; and a first plurality of relay driver circuits each connected to actuate one of said relays upon receipt of one pulse of a cyclically repeating pulse train wherein each pulse is indicative of the reception of a transmission from one of said fixed transmitting stations.

4. The device of claim 2 wherein each of said adjustable means is a potentiometer.

5. The device of claim 2 wherein each of said adjustable means is a digital-to-analog converter having a digital input representative of the compass bearing of one of said plurality of fixed transmitting stations as measured from said vehicle.

6. The device of claim 1 wherein said plurality of directional loop antennas comprises two loops mounted with their axes 90° apart in a horizontal plane.

7. The device of claim 1 wherein said conversion means comprises:

a plurality of trigger circuits each having an input terminal and first and second output terminals wherein said input terminals are connected in common and are adapted to receive said third analog signal, and said first and second output terminals are adapted to provide triggered and untriggered output signals, respectively, to said logic circuit means in response to said third analog signal wherein the number of triggered output signals from said plurality of trigger circuits is directly proportional to the amplitude of said third analog signal voltage.

8. The device of claim 7, including a plurality of preamplifier means each having an input connected to one of said plurality of directional loop antennas and two outputs 180° out of phase with each other, wherein:

said first switch means includes:

a plurality of relay means for connecting a single one of said preamplifier outputs to the navigational system in response to said control signals such that only one of said plurality of antennas is operative at any time.

9. The device of claim 7, including a plurality of preamplifier means each having an input connected to one of said plurality of directional loop antennas and two outputs 180° out of phase with each other, wherein:

said first switch means includes:

a plurality of relay means for connecting one of said two outputs of each preamplifier to the navigational system in response to said control signals such that all of said plurality of antennas are operative at all times.

10. The device of claim 1 wherein said conversion means provides a three digit binary coded output signal to said logic circuit means representative of the relative bearing of said one station with respect to said vehicle, and said logic circuit means comprises:

a plurality of NAND logic gates connected to provide said plurality of control signals on any of four output terminals according to the following table:

| Binary coded input | | | Output terminal |
|---|---|---|---|
| 0 | 0 | 0 | 1. |
| 0 | 0 | 1 | 1 and 2. |
| 0 | 1 | 0 | 2. |
| 0 | 1 | 1 | 2 and 3. |
| 1 | 0 | 0 | 3. |
| 1 | 0 | 1 | 3 and 4. |
| 1 | 1 | 0 | 4. |
| 1 | 1 | 1 | 4 and 1. |

11. The device of claim 10, including a plurality of preamplifier means each having an input connected to one of said plurality of directional loop antennas and two outputs 180° out of phase with each other, wherein said first switch means includes:

four relay means respectively connected to the four output terminals of said logic circuit means thereby to connect said preamplifier outputs to the navigational system in response to said control signals.

12. An automatic antenna switching circuit for coupling particular ones of two crossed-loop antennas mounted on a vehicle to a navigation system in response to an analog signal representative of the relative bearing of a ground station with respect to said vehicle comprising:

switching circuit means having said analog signal as an input for providing triggered and untriggered outputs such that the number of triggered outputs is directly proportional to the amplitude of said analog signal;

logic circuit means connected to said switching circuit means to thereby provide first and second control signals in response to the triggered and untriggered output signals from said switching circuit means;

first preamplifier means connected to one of said two crossed-loop antennas thereby to provide a first output signal and a second output signal 180° out of phase therewith;

second preamplifier means connected to the other of said two crossed-loop antennas thereby to provide a first output signal and a second output signal 180° out of phase therewith;

a narrow band tuned summing amplifier having two inputs and providing an output signal;

a first relay means for switchably connecting one of said first and second output signals from said first preamplifier means to one input of said summing amplifier in response to said first control signal; and a second relay means for switchably connecting one of said first and second output signals from said second preamplifier means to the other input of said summing amplifier in response to said second control signal.

13. An automatic antenna switching circuit for coupling particular ones of two crossed-loop antennas mounted on a vehicle to a navigation system in response to a three digit binary coded number representative of the relative bearing of a ground station with respect to said vehicle comprising:

logic circuit means having said binary coded number as an input, for providing an output signal on any of four output terminals in accordance with the following table:

| Binary coded input | | | Output terminal |
|---|---|---|---|
| 0 | 0 | 0 | 1. |
| 0 | 0 | 1 | 1 and 2. |
| 0 | 1 | 0 | 2. |
| 0 | 1 | 1 | 2 and 3. |
| 1 | 0 | 0 | 3. |
| 1 | 0 | 1 | 3 and 4. |
| 1 | 1 | 0 | 4. |
| 1 | 1 | 1 | 4 and 1. |

first preamplifier means connected to one of said two crossed-loop antennas thereby to provide a first output signal and a second output signal 180° out of phase therewith;

second preamplifier means connected to the other of said two crossed-loop antennas thereby to provide a first output signal and a second output signal 180° out of phase therewith;

a narrow band tuned summing amplifier having two inputs and providing an output signal, including attenuator means for reducing the gain of said amplifier; and switching means for switchably connecting the output signals of said first and second preamplifier means to the first and second inputs, respectively, of said summing amplifier in response to the output signals of said logic circuit means.

14. The circuit of claim 13 wherein said switching means comprises:

a first relay means for switchably connecting the first output signal of said first preamplifier means to one input of said summing amplifier when actuated by a signal appearing on the first output terminal of said logic circuit means;

a second relay means for switchably connecting the second output signal of said first preamplifier means to said one input of said summing amplifier when actuated by a signal appearing on the second output terminal of said logic circuit means;

a third relay means for switchably connecting the first output signal of said second preamplifier means to the other input of said summing amplifier when actuated by a signal appearing on the third output terminal of said logic circuit means;

a fourth relay means for switchably connecting the second output signal from said second preamplifier means to said other input of said summing amplifier when actuated by a signal appearing on the fourth output terminal of said logic circuit means;

said first, second, third and fourth relay means further including means for enabling said attenuator means when one of said first and second relays and one of said third and fourth relays are simultaneously actuated.

References Cited

UNITED STATES PATENTS

| | | | |
|---|---|---|---|
| 3,209,356 | 9/1965 | Smith | 343—105 |
| 3,303,502 | 2/1967 | Mahoney | 343—105 |

RODNEY D. BENNETT, Jr., Primary Examiner

RICHARD E. BERGER, Assistant Examiner